Dec. 3, 1963 G. A. LYON 3,112,958
WHEEL COVER
Filed March 23, 1961 2 Sheets-Sheet 2
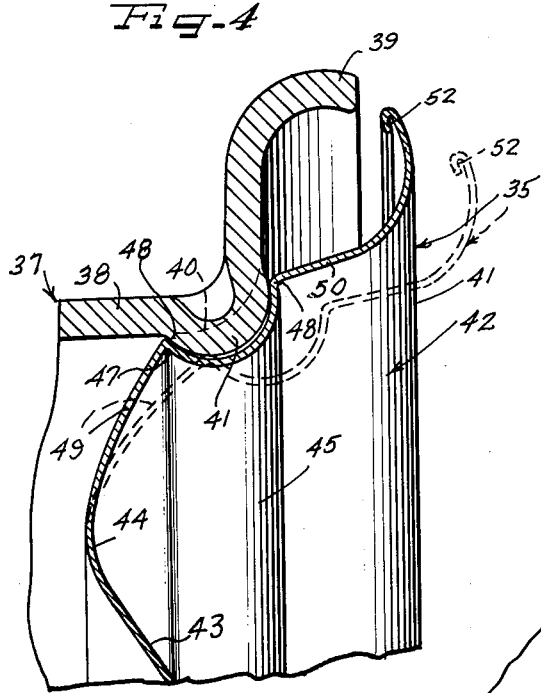
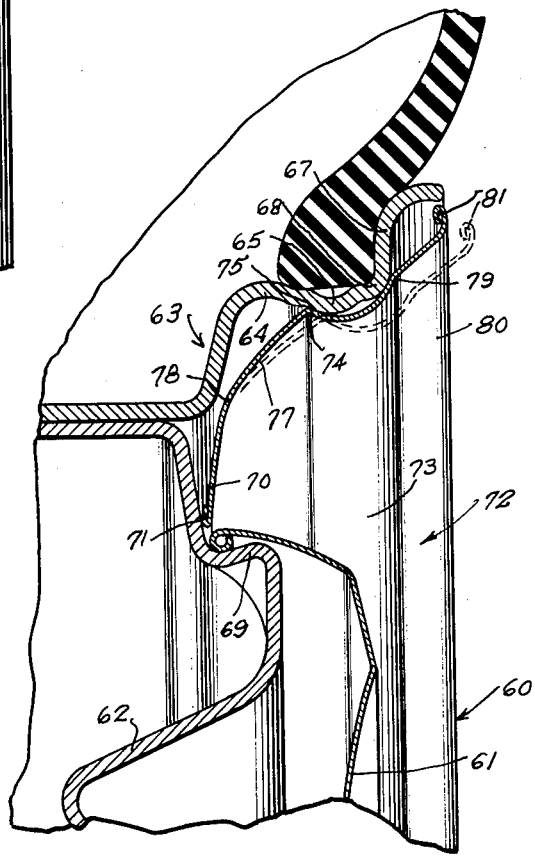
INVENTOR.
George Albert Lyon
BY
Hill, Sherman, Meroni, Gross & Simpson
ATTORNEYS United States Patent Office 3,112,958
Patented Dec. 3, 1963

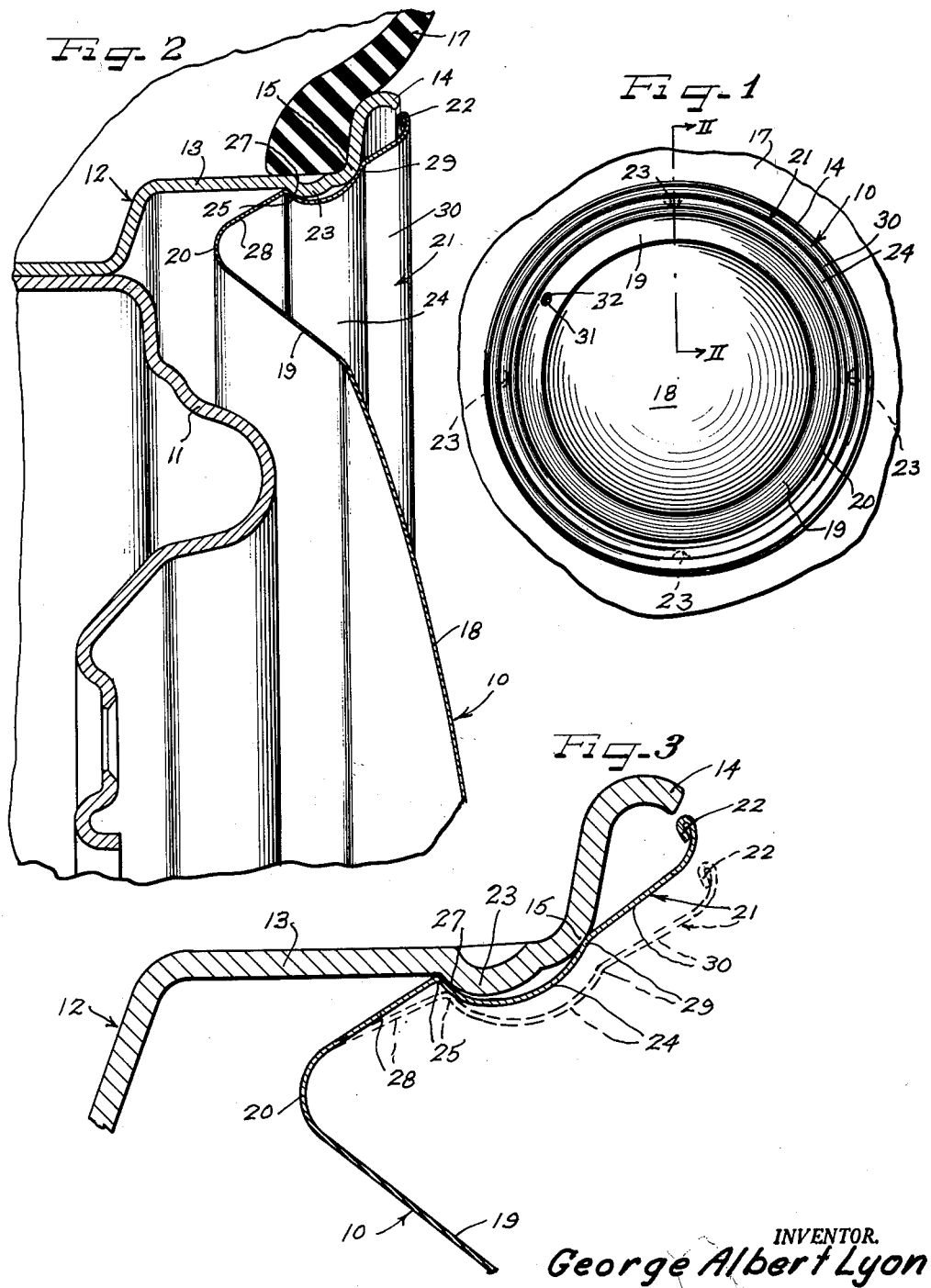

3,112,958
WHEEL COVER
George Albert Lyon, Detroit, Mich., assignor to Lyon Incorporated, Detroit, Mich., a corporation of Delaware
Filed Mar. 23, 1961, Ser. No. 97,774
6 Claims. (Cl. 301—37)

The present invention relates to improvements in wheel structures and more particularly concerns the ornamental and protective covering of the outer sides of vehicle wheels.

The present application is a continuation-in-part of my copending application Serial No. 657,941 filed May 8, 1957, now Patent No. 2,995,403 issued August 8, 1961.

Economy in wheel covers for the outer sides of vehicle wheels such as automobile wheels can be effected not only by the utilization of as low cost as practicable material, both as to grade and gauge, but also by a construction that reduces to a minimum the amount of material required, and in addition by a construction that reduces to a bare minimum the number of manufacturing operations. Die pressing of sheet metal wheel covers is a practical method of manufacture for large volume production. High speed spinning techniques are also being developed for smaller production runs of sheet metal members such as wheel covers.

An important object of the present invention is to provide a wheel structure including a novel cover member that can be produced at minimum cost and functions efficiently for press-on, pry-off engagement with rigid retaining protrusions on a tire rim of a vehicle wheel.

Another object of the invention is to provide an improved wheel cover construction having novel means for press-on, pry-off retaining engagement with rigid retaining bumps on the intermediate flange of a tire rim.

A further object of the invention is to provide a new and improved wheel cover construction having a novel marginal retaining shoulder structure which is resiliently flexible for press-on, pry-off interengagement with retaining protrusions of a wheel rim as enabled by flexure of the entire marginal portion of the cover member in the vicinity of each of the retaining protrusions.

Still another object of the invention is to provide a novel cover construction having improved resiliently flexible retaining means engageable with rigid protrusions of a wheel rim.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is an enlarged schematic sectional detail view of the tire rim and wheel cover taken in the same plane as FIGURE 2;

FIGURE 4 is a radial sectional detail view of a modification; and

FIGURE 5 is a radial sectional detail view of another modification.

Referring to FIGURES 1, 2 and 3, a cover member 10 is constructed and arranged to be applied over the outer side of a vehicle wheel including a wheel body 11 carrying a tire rim 12 having a generally radially inwardly facing and axially outwardly extending intermediate or bead seat flange 13 joining a generally radially outwardly and then axially inwardly turned terminal flange 14 on a juncture shoulder 15. A pneumatic tire 17 of the tubeless variety is adapted to be carried by the tire trim 12.

According to the present invention, the cover member 10 is constructed in an economical form adapted to be made by die stamping techniques or spinning techniques or a combination thereof as may be preferred. Suitable material for the wheel cover member 10 comprises thin gauge stainless steel, brass, aluminum alloy and the like possessed of the characteristic of work hardening so as to be endowed with resilient flexibility in those portions thereof which are cold worked during formation of the cover member.

In this instance, the cover member 10 is of the full disk type, that is it is of a diameter which will substantially cover the entire outer side of the vehicle wheel. To this end the cover member 10 includes a crown central portion 18 having an annular generally radially outwardly and axially inwardly sloping side wall 19 which merges at a circular axially inwardly projecting dished juncture rib 20 with a generally radially and axially outwardly oblique marginal portion 21 of a diameter to overlie the intermediate flange 13 and the terminal flange 14 and terminates in a turned reinforcing and finishing edge 22 arranged to lie on a diameter which places it in the assembly adjacent to the tip of the terminal flange 14. It will be observed that the cover portions 19 and 21 diverge from one another in a generally axially outward direction, but converge toward one another in a generally axially inward direction toward the juncture dished rib lying on a diameter which is of substantially smaller diameter than the intermediate flange 13 of the tire rim so that in a sense the dished portion or rib 20 is telescoped within the intermediate flange in assembly.

According to the present invention, the generally oblique marginal portion 21 of the cover member has means thereon for engaging in press-on, pry-off relation with the tire rim 12 and more particularly with generally radially inwardly projecting protuberances or bumps 23 on the axially outer portion of the intermediate flange 13 adjacent to the juncture shoulder 15 of the rim. To this end, the cover marginal portion 21 is constructed and arranged to be resiliently generally radially flexible and is provided intermediately thereof with a circular bump clearing channel-rib 24. At its axially inner side the channel rib 24 is provided with a continuous circular retaining shoulder 25 facing generally radially and axially outwardly and so disposed that shoulder portions thereof will engage retainingly behind the retaining bumps 23 and more particularly against generally radially and axially inwardly facing retaining shoulders 27 provided by the bumps. Between the dished intermediate rib 20 of the cover member and the circular shoulder 25 extends an annular strut section 28 of the cover marginal portion 21 which joins the shoulder structure 25 on an angular juncture near 90° and extends unilinearly directly from the shoulder structure 25 throughout a substantial width to the relatively large radius dished intermediate, inset rib 20 of the cover member. As a result, the strut section 28 is resiliently flexible across its plane, that is in a generally radial direction to accommodate radial resilient deflections of the shoulder structure 25 in the area of the bump-engaging portions thereof incident to pressing the cover into retained engagement on the wheel or prying the same free from the wheel.

It will be observed that the channel-rib 24 is of a width and uniform transversely arched form as well as channel depth to extend in clearance relation to the retaining protrusion bumps 23 from the shoulder structure 25 to a seating circular shoulder structure 29 spaced radially and axially outwardly from the shoulder structure 25 a sufficient distance to engage in retaining relation against the rim shoulder 15, while the diameter on which the retaining shoulder 25 lies is so related to the diameter on which the retaining bump shoulders 27 lie as to make firm contact with the retaining bump shoulders when the circular generally axially inwardly facing shoulder 29 of the cover member margin thrusts against the rim shoulder 15. Thus, the cover member shoulder structure 25 retains the cover against axially outward displacement, while the cover shoulder 29 holds the cover in its axially inward position.

Extending radially and axially outwardly from angular juncture with the shoulder 29 is an annular lever section 30 of substantial width of the cover outer marginal portion 21. At its outer extremity this section is turned as shown for reinforcing and finishing purposes to the underturned reinforcing and finishing extremity flange 22. A chamber defined between the marginal section 30 and the terminal flange 14 of the tire rim is suitable for accommodating wheel balancing weights.

In applying the cover member 10 to the outer side of the wheel, a valve stem opening 31 in the dished portion 20 is registered with a valve stem 32 projecting from the tire rim 12, and the retaining bump protrusions 23 are engaged with the retaining shoulder structure 25 of the wheel cover. Initially, and substantially coincident with registration of the valve stem aperture 31 with the valve stem 32, the retaining bump protrusions 23 nearest the valve stem 32 are received within the clearance channel of the channel-rib 24 by a canted approach of the cover marginal portion 21 toward such bump protrusions. Then, the remainder of the marginal portion 21 of the cover member is snapped into engagement with the remaining bump protrusions 23. In so doing, the strut section 28 cams inwardly on the retaining bump protrusions 23 and is deflected radially inwardly, substantially as shown in dash outline in FIGURE 3, thus resiliently deflectably swinging the portions of the channel-rib 24 and the lever section 30 also radially inwardly generally about a fulcrum at or adjacent to the dished rib 20. After the shoulder structure 25 has cleared past the radially innermost projection or nose of each of the respective retaining bump protrusions 23, during such press-on of the cover, the resilient tension developed in the resiliently flexed area of the marginal portion 21 causes the shoulder portions of the shoulder structure 25 in engagement with the retaining bump protrusions 23 to snap into engagement with the retaining bump shoulders 27 and the seating shoulder 29 to thrust against the rim shoulder 15, thus maintaining the bump-engaging shoulder portions in firm retaining engagement with the bump shoulders 27 as shown in FIGURES 2 and 3 in full outline.

For removing the cover member 10 from the wheel, the reverse of the application process is employed, a pry-off tool being inserted behind the turned edge extremity 22 and if necessary also progressively worked in behind the seating shoulder 29 and utilizing it as a pry-off shoulder to effect axially outward camming of the shoulder structure 25 over and past the respective retaining bump protrusions 23 and thus flexing of the associated area of the marginal portion 21 radially inwardly as depicted in dash outline in FIGURE 3 until the shoulder structure 25 has been moved to the axially outer sides of the respective retaining bumps 23 and the cover is freed from the tire rim.

In the modification of FIGURE 4, a cover member 35 embodying the invention is constructed and arranged to be applied to the outer side of a vehicle wheel including a multi-flange, drop center tire rim 37 supported by a wheel body (not shown) which may be substantially the same as the wheel body 11 of FIGURE 2. An intermediate bead seat flange 38 of the tire rim 37 joins a generally radially outwardly and then axially outwardly extending terminal flange 39 on a juncture shoulder 40. Projecting generally radially and axially outwardly from the juncture shoulder 40 is a circumferentially spaced series of cover retaining bump protrusions 41 of a type more particularly described in my copending application Serial No. 657,941 hereinbefore referred to.

With only slight modification in shape in that the cover member 35 is adapted to be shallower than the cover member 21, because of the axially outward as well as radially inward projection of the retaining bumps 41, the cover member 35 is provided with a generally radially resiliently flexible marginal portion 42 engageable in press-on, pry-off relation with the retaining bumps 41 in substantially the same manner as described in connection with the cover member 10. Suitable material such as stainless steel, brass, aluminum alloy, and the like may be utilized in making the cover 35, similarly as described for the cover 10, and the cover 35 may be provided with any suitable central or crown portion having an annular side wall 43 sloping generally radially outwardly and axially inwardly to an intermediate circular axially inwardly dished rib portion 44 from which the outer marginal portion 42 slopes in a generally radially and axially outward direction for overlying disposition to the tire rim 37.

Intermediately, the marginal cover portion 42 has a circular channel-rib 45 which projects generally radially inwardly and axially outwardly and defines a channel which opens radially outwardly and axially inwardly and is receptive of the retaining bumps 41, the arch of the rib-channel being on a radius which clears the retaining bumps so that a generally radially and axially outwardly facing shoulder 47 at the axially inner side of the channel rib is engageable retainingly with a radially and axially inwardly facing shoulder 48 of the respective retaining bumps and a circular seating shoulder 48 at the axially outer side of the channel rib is engageable against the retaining bumps in overlying relation to the rim shoulder 40. Through this arrangement, the retaining bumps 41 are gripped between the cover shoulders 47 and 48, the shoulder 47 holding the cover against axially outward displacement and the shoulder 48 holding the cover in its axially inward position.

Joining the shoulder 47 at nearly right angles is an annular strut section 49 of the cover marginal portion 42 extending substantially unilinearly directly from the shoulder 47 to the dished rib 44.

Extending generally radially and axially outwardly from the shoulder 48 of the cover member is an annular lever section 50 of substantial width turned in its outer portion 51 to overlie the terminal flange 39 and having an underturned edge flange 52 for finishing and reinforcement purposes.

Application and removal of the cover member 35 with respect to the wheel is effected substantially as described in connection with the cover member 10. On pressing the cover member 35 axially inwardly, the strut section 49 cams on the retaining bumps 41 and the area of the cover marginal portion 42 thus affected yields resiliently to deflect generally radially inwardly as depicted in dash outline in FIGURE 4 until the shoulder 47 snaps in behind the retaining bump shoulder 48 whereupon the resilient tension of the deflected area of the cover marginal portion 42 causes it to move into the full outline position shown wherein the retaining bump 18 is gripped between the shoulders 47 and 48. Removal of the cover is readily effected by inserting a pry-off tool behind the lever section 50 and behind the shoulder 48, if necessary, the pry-off force moving the cover marginal portion 42 axially outwardly and deflecting the same radially inwardly to clear the retaining bump 41.

In the modified arrangement of FIGURE 5, a cover member 60 in the form of a trim ring is associated with a hub cap 61 for disposition over the outer side of a vehicle wheel including a wheel body 62 supporting a multi-flange, drop center tire rim 63 having an intermediate bead seat flange 64 provided with a circumferential series of spaced cover retaining bump protrusions 65 and joined to a generally radially outwardly and then axially outwardly extending terminal flange 67 on a shoulder 68 which faces generally radially inwardly and axially outwardly.

The hub cap 61 is dimensioned to engage generally radially outwardly projecting retaining bumps 69 on the wheel body.

In order to afford the appearance of a complete cover of the full disk type over the outer side of the wheel after the cover assembly including the ring member 60 and the hub cap 61 have been applied to the wheel, the ring member 60 is of a width to extend from the outer edge of the hub cap 61 into substantially completely overlying relation to the tire rim 63. Suitable material from which the cover member 60 may be made comprises stainless steel, brass, aluminum alloy or like sheet or strip material of thin gauge and work hardenability to afford resilient flexibility in the finished article.

The body of the ring cover member 60 includes an annular inner marginal flange portion 70 of an inside diameter to overlie the wheel body 62 from adjacent to the hub cap retaining bump protrusions 69 thereon to juncture with the tire rim 63, the inner edge of the inner marginal flange portion 70 being turned as at 71 to provide a reinforcement and finish for the edge. This body flange portion 70 joins an outer marginal circular portion 72 of the cover member 60 which, in this instance, comprises the major portion of the cover member and corresponds to the outer marginal portions 21 and 42 of the cover members 10 and 35 in structure and function. To this end, the cover member portion 72 is provided with an intermediate circular channel-rib 73 which projects generally radially inwardly and axially outwardly and affords a generally radially outwardly and axially inwardly opening channel receptive of the retaining bump protrusions 65. On its axially inner side, the channel-rib 73 is defined by a cover-retaining shoulder structure 74 facing generally radially and axially outwardly and engageable in press-on, pry-off relation with generally radially and axially inwardly facing shoulders 75 of the retaining bumps 65. Extending generally radially and axially inwardly directly unilinearly from the shoulder structure 74 on a near 90° juncture is an annular strut section 77 which at its inner terminus joins the inner marginal body flange 70 on a relatively large radius generally axially inwardly dished circular juncture rib 78 serving to facilitate fulcruming during radial deflections of the strut section 77 and the channel-rib 73 between the full line and dash outline positions shown.

On its outer side, the channel-rib 73 is provided with a generally axially inwardly facing circular shoulder 79 engageable with the rim shoulder 68 and thereby maintaining the portions of the shoulder structure 74 engaging the bump shoulder 75 in firm retaining engagement therewith. Extending angularly generally radially and axially outwardly from the shoulder 79 is an annular lever section 80 which overlies the terminal flange 67 and has an outer terminal underturned reinforcing and finishing flange 81 disposed adjacent to the tip of the terminal flange.

Attachment of the cover member 60 to the wheel and removal thereof is effected similarly as described in connection with the cover member 10. In pressing the cover member 60 axially inwardly into position with respect to any one of the retaining bumps 65, radially inward resilient flexure deflection of the area of the cover member aligned with the bump, by camming of the strut section 77 over the bump enables clearing the bump until the shoulder structure 74 snaps in behind the bump shoulder 75 and the seating shoulder 79 engages the rim shoulder 68. Removal of the cover member 60 is effected by inserting a suitable pry-off tool behind the lever section 80 and effecting pry-off leverage to deflect the outer marginal portion 72 of the cover member resiliently radially inwardly from the full line position to the dash line position, accompanied by axially outward pry-off force and thereby clearing the shoulder structure 74 from the retaining bumps.

In all forms of the invention it will be observed that there is a common characteristic in that the entire outer marginal portion inclusive of the bump-clearing channel-rib and the inner strut section and the outer lever section of the outer marginal portion of the cover member is locally resiliently generally radially flexible in the areas thereof engageable with the respective retaining protrusions or bumps. As a result, the entire annular marginal portion is resiliently coactive with each shoulder portion in engagement with a retaining bump to maintain a firm grip of the retaining shoulder of the cover with the retaining shoulder of the bump.

Although the outer marginal portion of the cover in each instance is highly resistant to distortion in the direction of the planes of the strut and lever sections and across the channel-rib portion between the shoulders at the opposite sides thereof, there is a relatively wide range of local resilient radial deflection permitted, as described, for press-on and pry-off action without permanent distortion or buckling of the outer marginal cover portion. At all times where there is even slight resilient deflection from the normal circularity of the outer marginal portion of the cover member, there is a strong resilient tension reaction toward return to normal circularity, which is highly useful in assuring firm grip of the retaining shoulder portions of the cover member with the retaining shoulders of the retaining protrusion bumps. This feature is enhanced by the particular construction of the channel-rib of uniform radius between the shoulders thereof and the shoulders affording widely divergent mouth sides for the channel-rib. This relatively large radius, flaring sided, generally chordal transverse shape of the channel-rib and the fairly wide expanse of the respective strut and lever sections of the cover marginal portion enable the local resilient generally radial flexure thereof even though the channel-rib affords substantial enhancement of resilience or spring action resisting such flexure.

The unilinear thrust action of the strut section with respect to the retaining shoulder structure of the channel-rib, in each instance, assures complete resistance to axially inward deflection of the shoulder portions engaging the retaining shoulders of the retaining bumps. This assures firm tensioning of the retaining shoulder portions of the cover member toward the retaining shoulders of the bumps by resilient tensioning of the cover outer marginal portion and the axially inward stop or position delimiting action of the seating shoulder at the axially outer side of the channel-rib against the rim shoulder.

Because of the inherent radial resilient flexibility of the outer marginal portion of the cover it can readily follow any possible weaving or resilient deflectional movements of the tire rim in service under driving stresses and strains. This assures firm retention of the cover member on the wheel without danger of working off in service.

It will be understood that modifications and variations may be effected without departing from the scope of the novel concepts of the present invention.

I claim as my invention:

1. In a wheel structure including a tire rim having an intermediate flange joining a terminal flange and provided with generally radially inwardly projecting rigid cover retaining protrusions adjacent juncture of said rim flanges affording generally axially inwardly facing cover retaining shoulders, a circular cover member for disposition in press-on, pry-off relation over the outer side of the wheel including a generally radially and axially outwardly extending marginal portion having a circular channel-rib intermediately therein projecting generally radially inwardly and axially outwardly and affording a generally radially outwardly and axially inwardly opening channel receptive of the protrusions and defined at its axially inner side by a shoulder structure facing generally radially and axially outwardly and having portions thrustingly retainingly engageable with said protrusion shoulders, said cover marginal portion having an annular strut section of substantial width extending from a near 90° juncture with said shoulder structure generally radially and axially inwardly substantially unilinearly from the juncture and thrusting toward said shoulder structure to prevent axial deflection of the shoulder structure, said channel-rib having a circular shoulder spaced radially and axially outwardly from said shoulder structure and engageable with opposing generally axially outwardly facing shoulder means on the tire rim to define the axially inward disposition of the marginal portion and thus assuring retention engagement of the shoulder structure with the protrusion shoulders, said marginal portion having projecting from said circular shoulder generally radially and axially outwardly a lever section overlying the terminal flange, said marginal portion inclusive of said strut section, said channel-rib and said lever section being locally generally radially resiliently flexibly swingable about a fulcrum located adjacent the axially inner end of the strut section in the press-on and pry-off movement of said shoulder structure past said protrusion.

2. In a wheel structure as defined in claim 1, said axially outwardly facing rim shoulder means being provided by a juncture shoulder of the intermediate and terminal flanges.

3. In a wheel structure as defined in claim 1, said axially outwardly facing shoulder means of the tire rim being provided by generally axially outwardly projecting portions of said protrusions.

4. In a wheel structure as defined in claim 1, said marginal portion joining a central crown portion of the cover member on a dished circular axially inwardly extending rib of substantial radius.

5. A wheel structure as defined in claim 1, wherein the cover member comprises a ring having an inner marginal body flange joined to said strut section and projecting generally radially inwardly therefrom.

6. In a wheel structure including a tire rim having an intermediate flange joining a terminal flange and provided with generally radially inwardly projecting rigid cover retaining protrusions adjacent juncture of said rim flanges affording generally axially inwardly facing cover retaining shoulders, a circular cover member for disposition in press-on, pry-off relation over the outer side of the wheel including a generally radially and axially outwardly extending marginal portion having a shoulder structure facing generally radially and axially outwardly and having portions thrustingly retainingly engageable with said protrusion shoulders, said cover marginal portion having an annular strut section of substantial width extending from juncture with said shoulder structure generally radially and axially inwardly substantially unilinearly from the juncture and thrusting toward said shoulder structure to prevent axial deflection of the shoulder structure, said marginal portion having a shoulder spaced radially and axially outwardly from said shoulder structure and engageable with opposing generally axially outwardly facing shoulder means on the tire rim to define the axially inward disposition of the marginal portion and thus assuring retention engagement of the shoulder structure with said protrusion shoulders, said marginal portion having projecting from said shoulder generally radially and axially outwardly to a radially outer edge defining the cover member a lever section overlying the terminal flange in spaced relation, said marginal portion entirely to said outer edge and inclusive of said strut section, said shoulder structure and shoulder and said lever section being locally generally radially resiliently flexibly swingable as a unit about a fulcrum located adjacent the axially inner end of the strut section to enable press-on and pry-off movement of said shoulder structure past said protrusions.

References Cited in the file of this patent

UNITED STATES PATENTS

| | | |
|---|---|---|
| 2,308,616 | Lyon | Jan. 19, 1943 |
| 2,308,617 | Lyon | Jan. 19, 1943 |
| 2,607,633 | Lyon | Aug. 19, 1952 |
| 2,755,140 | Lyon | July 17, 1956 |
| 2,865,680 | Lyon | Dec. 23, 1958 |
| 2,865,681 | Lyon | Dec. 23, 1958 |
| 2,995,403 | Lyon | Aug. 8, 1961 |
| 2,996,337 | Hurd | Aug. 15, 1961 |

FOREIGN PATENTS

| | | |
|---|---|---|
| 531,996 | Italy | Aug. 8, 1955 |